United States Patent Office 2,714,909
Patented Aug. 9, 1955

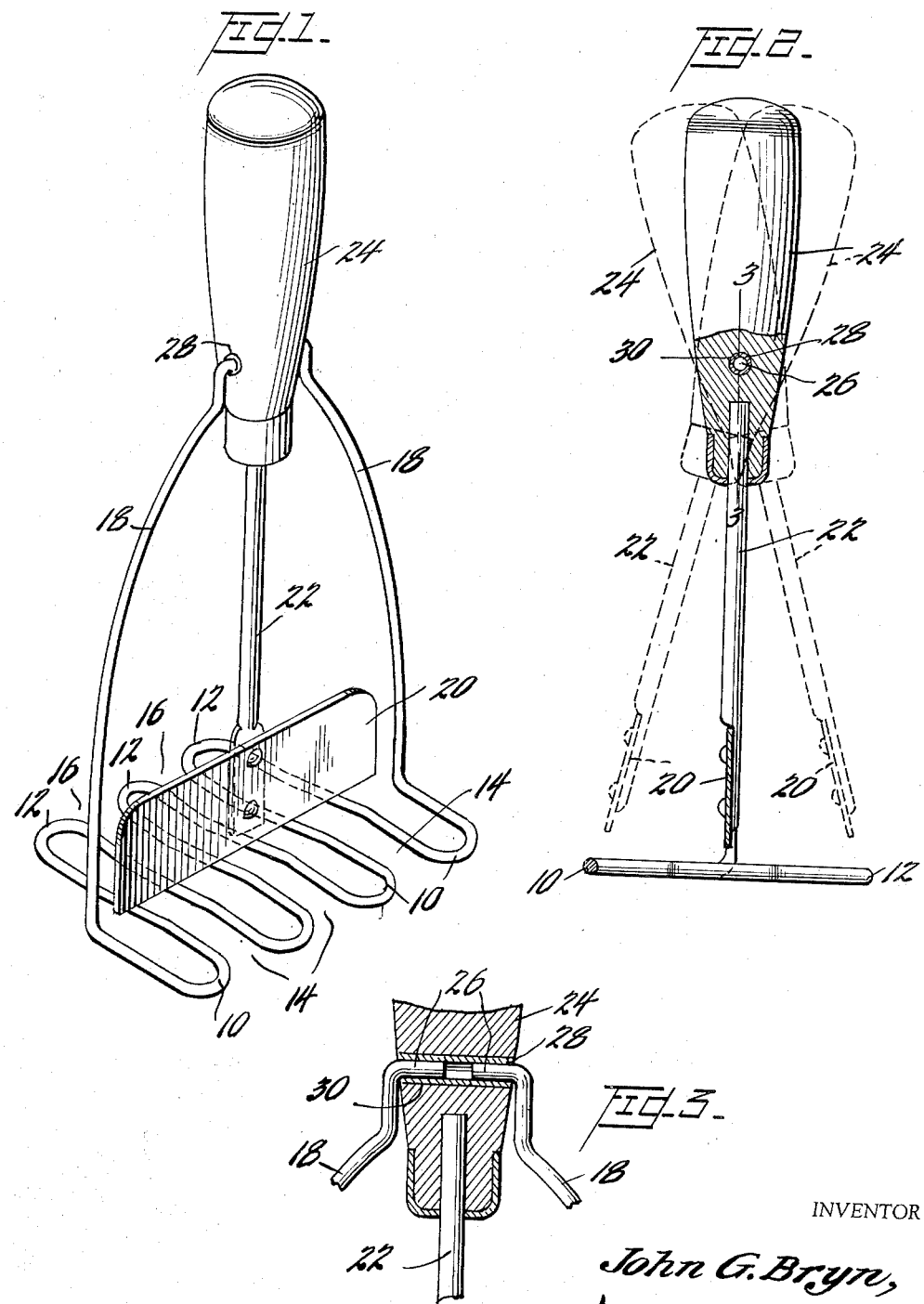

2,714,909

POTATO MASHERS

John G. Bryn, Chevy Chase, Md.

Application March 27, 1953, Serial No. 345,159

7 Claims. (Cl. 146—213)

The present invention relates to implements for mashing potatoes, and other vegetables or similar substances, and the object of the invention is to provide an improved implement of this kind which overcomes disadvantages which are inherent in the use of such implements as heretofore constructed.

In using an implement of this kind as heretofore constructed with a grid-like mashing member, particularly in the mashing of potatoes after being cooked and to prepare them for the table, the potatoes squeeze upwardly through the mashing member and accumulate on the upper side thereof, usually requiring striking of the implement on the rim of the pot or other container to dislodge the accumulation of potatoes in order to return them to a position in the pot to enable the mashing thereof to be completed, which mode of clearing the mashing member of the potatoes accumulated thereon is inconvenient, time consuming and otherwise objectionable.

These objections are obviated by the present invention which provides an implement of this kind having a blade mounted thereon to move over the upper side of the mashing member and thereby remove and sweep aside the accumulation of potatoes or the like which squeeze through the mashing member to the upper side thereof during the mashing operation and place the potatoes in the pot where they may readily be subjected to further mashing operation until the mashing thereof has been completed, without the necessity of removing the implement from the pot or other container.

A further object of the invention is to provide an implement of this kind in which the same handle which serves as the means for operating the masher to perform the mashing operation also serves as means for imparting the sweeping operation to the blade, so that the mashing and sweeping operations may be performed easily and with facility, and without requiring removal of the hand from the handle.

In the accompanying drawing which shows the preferred embodiment of the invention—

Figure 1 is a perspective view of a potato masher to which the invention is applied.

Figure 2 is a side elevation of the potato masher, illustrating diagrammatically the manner in which the blade is movable over the upper side of the mashing member to sweep accumulated potatoes therefrom.

Figure 3 is an enlarged detail section on the line 3—3 in Fig. 2.

Similar parts are designated by the same reference numerals in the different views.

In the present instance, the invention is shown applied to a potato masher of the type in which the mashing member is composed of a length of relatively stiff wire bent alternately in reverse directions to form a sinuous or serpentine grid-like structure having bends or loops 10 and 12 respectively at its opposite sides with intervening openings 14 and 16 which respectively are open at the opposite sides of the mashing member. The terminals of the sinuous or serpentine grid-like structure are extended upwardly therefrom to form a pair of uprights 18 through which vertical movements are imparted to the mashing member to perform the mashing operation.

According to the present invention, a blade 20 is provided which is mounted to swing laterally over the mashing member in close proximity to its upper side. Preferably and as shown in the present instance, this blade is operated by the same handle which serves to operate the mashing member during the mashing operation. For this purpose, the blade 20 is riveted or otherwise fixed to a shank 22 the upper end of which is fixed in the lower end of a handle 24. The upper end of the uprights 18 are turned toward one another in alinement to form a pair of journals 26, and these journals on the upper ends of the uprights have bearings in the handle, the handle, which is preferably of wood or other non-metallic material, being provided with a bushing 28 which is inserted into the bore 30 which extends horizontally or transversely through the lower portion of the handle and is rotatably engaged by the alined inturned ends 26 of the uprights 18. As the wire composing the mashing member and its uprights is somewhat yielding or resilient, the ends 26 on the upper ends of the uprights 18 may be sprung into the respective ends of the bushing 28 from the opposite sides of the handle, and they will be retained in the bushing. By the construction described, the handle 24 serves as means for imparting up and down movements to the mashing member through its connection with the uprights 18, and it is rockable laterally on the inturned ends 26 as a horizontal transverse axis to impart swinging movements to the blade 20 across the upper side of the mashing member, as indicated by the full and dotted lines in Fig. 2.

In using an implement constructed as shown and herein described for mashing, for example, potatoes, the handle 24 is grasped by one hand of the user and is moved up and down a suitable number of times on the potatoes, which are usually contained in the pot in which they are cooked, until the potatoes which are squeezed upwardly through the openings 14 and 15 accumulate on the upper side of the mashing member, whereupon the handle is swung laterally back and forth about its transverse pivotal axis, as indicated by the dotted lines in Fig. 2, which operation of the handle swings the blade 20 laterally over the mashing member, from side to side thereof and thereby sweeps the accumulation of potatoes from the mashing member to one side and the other side thereof and into positions in the pot where they may be subjected to further mashing operation until the mashing thereof has been completed.

It is to be understood that the invention is applicable to mashing implements having grid-like or foraminous mashing members of different types, but it is applicable to particular advantage to an implement of this kind having a mashing member of sinuous or serpentine formation as shown, as it has been found that as the blade swings across such a mashing member from side to side, the potatoes contained in some of the openings, as for example, the openings 14, will be swept therefrom and out through their open ends at one side of the mashing member as the blade is swung to that side, and the potatoes contained in the other openings, as the openings 16, will be swept therefrom and out through their open ends at the other side of the mashing member as the blade is swung to that side of the mashing member, thereby clearing the mashing member substantially completely of the potatoes which accumulate thereon during the mashing operation.

I claim:

1. An implement of the class described, comprising a mashing member having openings therein from its lower to its upper side, and a handle member movably connected to the mashing member and having a clearing member fixed thereto for reciprocating movement transversely over the upper side of the mashing member from one edge to an opposite edge thereof to remove therefrom material which has passed upwardly through the openings to its upper side.

2. A vegetable masher comprising a mashing member having openings therein from its lower to its upper side, and a handle having a blade fixed thereto and pivotally connected to the mashing member for reciprocating movement transversely across the upper side of the mashing member from one edge to an opposite edge thereof.

3. A vegetable masher comprising a mashing member having openings therein from its lower to its upper side, a blade, and a handle pivotally connected to the mashing member for imparting up and down reciprocations to the mashing member and for rocking movement on a horizontal axis and having the blade fixed thereto for swinging thereby over the upper side of the mashing member.

4. A potato masher comprising a mashing member providing openings from the lower to the upper side thereof, uprights extending upwardly from the mashing member, a member pivotally connected intermediately of its ends to the upper ends of the uprights to swing on a horizontal axis, a handle fixed to the upper end of said member, and a blade fixed to the lower end of said member and swingable thereby over the upper side of the mashing member.

5. A potato masher as defined in claim 4, wherein the upper ends of said uprights are bent horizontally toward one another in alinement, and are rotatable in bearings in the opposite sides of the handle.

6. A potato masher comprising a mashing member composed of wire bent alternately in opposite directions to form series of loops and intervening openings which are open alternately at opposite sides of same member, a handle above and pivotally connected to the mashing member for swinging movement on a horizontal axis, a shank fixed to the handle and extending downwardly therefrom, and a blade fixed to the lower end of said shank for movement transversely across the upper side of the mashing member in the direction of the lengths of the loops.

7. A potato masher comprising a mashing member composed of wire bent alternately in opposite directions to form series of substantially parallel loops with intervening openings which are open alternately at opposite sides of the mashing member, the terminals of the wire composing the mashing member extending upwardly therefrom and having their upper ends turned toward one another in horizontal alinement, a handle having bearings in its sides in which the ends of the uprights are rotatable, and a blade fixed to the handle and extending therefrom to a position above but adjacent to the upper side of the mashing member and swingable over the upper side of the mashing member by rocking movements of the handle on its bearings.

References Cited in the file of this patent

UNITED STATES PATENTS

| 154,123 | Chadwick | Aug. 18, 1874 |
| 1,336,861 | Roberts | Apr. 13, 1920 |
| 1,729,232 | Waner | Sept. 24, 1929 |
| 2,575,978 | Scheidecker | Nov. 20, 1951 |

FOREIGN PATENTS

| 82,225 | Switzerland | Sept. 22, 1919 |